Dec. 22, 1959  E. A. BADALI  2,917,953
PNEUMATIC TOOL SUPPORT
Filed Feb. 24, 1959
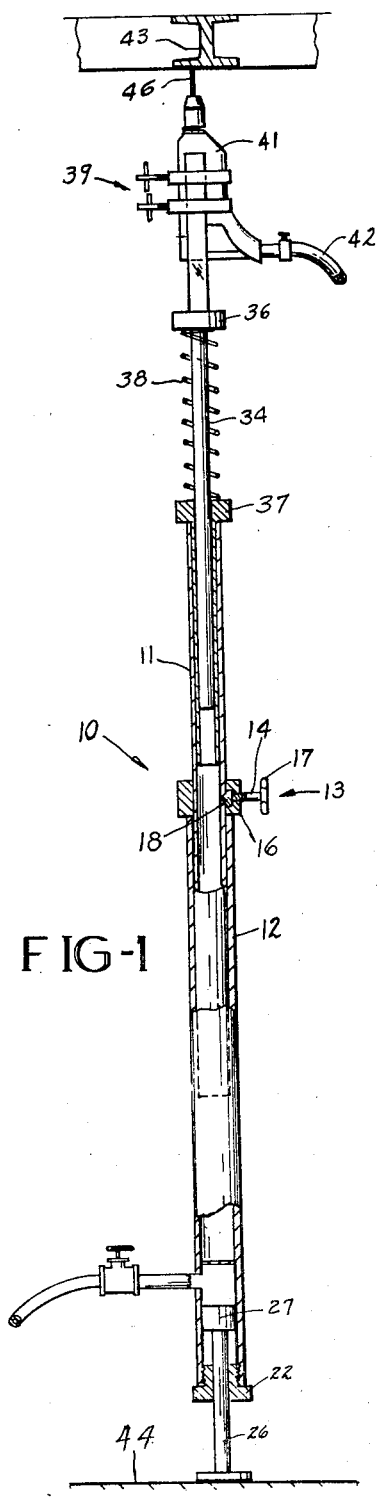
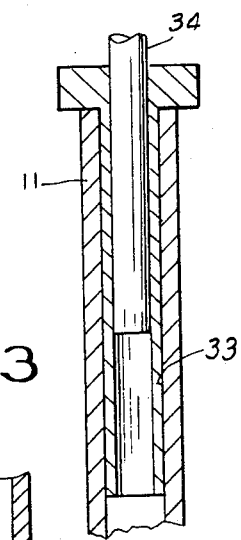
FIG-3
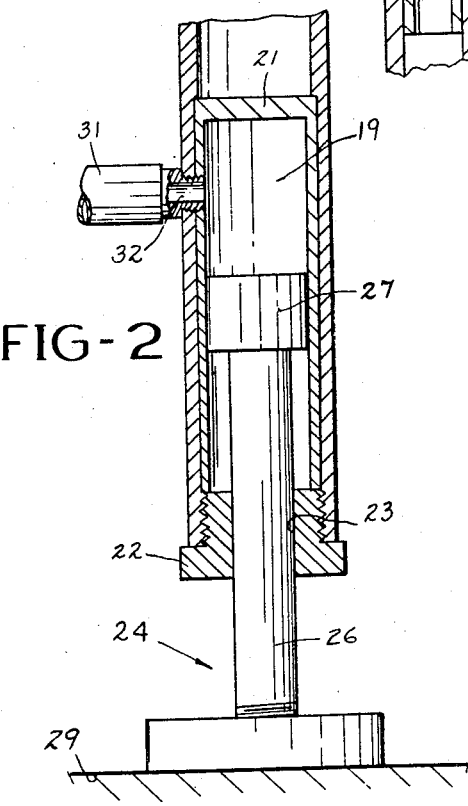
FIG-2
FIG-1
INVENTOR.
EDWARD A. BADALI

2,917,953
PNEUMATIC TOOL SUPPORT

Edward A. Badali, Hamden, Conn.

Application February 24, 1959, Serial No. 795,231

5 Claims. (Cl. 77—7)

The present invention relates to tool supports and in particular to a tool support operative to hold a tool such as a hammer or drill firmly against a work piece where the work piece is spaced from a fixed abutment.

A particular feature of the present invention is the provision of a novel tool support.

A further feature of the invention is the provision of a tool support operative to hold a power tool resiliently against an overhead workpiece but with sufficient thrust so that the tool constantly tends to advance towards the work piece.

For example, if the tool in question takes the form of a drill the tool support of the present invention is operative to hold the drill bit firmly against the work piece and to feed the bit into the work as a whole is bored in the work.

A further feature of the invention is the provision of a tool support operative to hold a power tool against a work piece where the work piece is spaced from a fixed abutment.

A still further feature is the provision of a tool support especially suited to hold in heavy power tools in contact with overhead work pieces.

A further feature of the invention is the provision of a tool support which can be readily dismantled for convenient transfer from job to job.

A further feature of the invention is the provision of a tool support for a pneumatic tool where both the tool and the support are operated by fluid pressure.

A tool support operative to hold a tool resiliently against a work piece embracing certain features of the present invention may comprise a pair of telescoping tubes, a first tube being formed with a fixed pressure cylinder including a ram projecting from said first tube and movable relative thereto, conduit means communicating with said cylinder for admitting fluid under pressure into said cylinder effective to drive said ram out of said first tube towards a fixed abutment, a second tube being constructed and arranged to receive a piston, said piston carrying a clamp means for receiving and holding a power tool, a resilient means disposed between the second tube and the piston operative to maintain the second tube and the piston in a resiliently spaced condition and a vise means mounted upon the tubes and operative to engage and lock the tubes in a given axial position wherein the tool virtually engages the work piece and the ram engages the abutment so that upon driving the ram the tool is urged against the work piece and held there resiliently.

Other features and advantages will become more apparent from the succeeding specification when read in conjunction with the appended drawings, in which:

Fig. 1 is an elevated view of a resilient tool support embracing the principles of the present invention with certain parts thereof broken away to show internal structure;

Fig. 2 is a sectional view of the bottom portion of the tool support of Fig. 2 shown enlarged for clarity; and, Fig. 3 is a corresponding sectional view of the top portion of the support of Fig. 1.

Referring now to the drawings, there is shown an exemplary embodiment of a resilient tool support embracing the principles of the present invention indicated generally by the reference numeral 10.

A pair of relatively movable telescoping tubes 11 and 12 are shown locked in a given axial position by a clamp device indicated generally at 13.

The clamp 13 includes a spindle 14 in threaded engagement with a ring 16 rigidly secured to the tube 12. One end of the spindle 14 is fitted with a hand wheel 17 while the opposite end carries a cone point 18 adapted to engage the tube 11, frictionally, whenever the spindle is advanced into the ring 16.

The opposite or lower end of the tube 12 is fitted with a pressure cylinder 19 bounded at one end by a wall 21 and at the other by a plug 22 threadedly engaging the tube 12 and having bore 23 for receiving a ram indicated generally by the reference numeral 24. The ram includes a rod 26, a driving head 27 and a threadedly connected foot 28 adapted to engage a fixed abutment 29.

A conduit 31 connected to a suitable source of fluid pressure (not shown) communicates with the cylinder 19 by means of a nipple 32 so that upon introduction of fluid pressure into the chamber 19 the ram 24 is driven out of the tube 12 so that the foot 28 of the ram engages the abutment 29.

The upper end of the tube 11 is fitted with a sleeve bearing 33 (Fig. 3) in turn slidably receiving a piston 34. A piston head 36 is maintained in a resiliently spaced position relative to a collar 37 carried by the tube 11 by a resilient means which in the disclosed embodiment of the invention takes the form of a coil spring 38. Obviously, other suitable resilient devices may be substituted.

The top of the piston 34 carries a clamp 39 operative to receive a power tool such as a pneumatic or electrically driven drill 41. The member 42 is intended to designate a fluid pressure conduit or an electrical conductor depending upon the means for powering the tool.

The resilient tool support operates in the following fashion:

Assume that one intends to drill a hold in a flange of the I beam 43. First an appropriate size power drill, either air or electrically powered, is disposed in the clamp 39. The support 10 carrying the drill is then placed in a vertical position with the foot of the de-energized ram 24 resting upon a fixed abutment such as the floor 44.

Thereafter the tube 11 is withdrawn from the tube 12 until bit 46 virtually engages the I beam 43. Next the pressure cylinder is pressurized and relative motion between the ram 24 and the locked tubes 11 and 12 tends to raise the tubes to compress the spring 38 with the result that the tool is firmly supported against the work piece (here an I beam) and the tool is resiliently urged into the work as the drill advances into the work.

Upon de-energizing the ram, the tool drops out of the work and may be further withdrawn as necessary by releasing clamp 13 and telescoping tube 11 further into tube 12.

Obviously the resilient support 10 need not be used in a vertical position but may be arranged horizontally or at any desired inclination.

Furthermore, attention is directed to the convenience with which the support may be "knocked down" or dismantled. The piston 34 carrying the spring 38 may be withdrawn from the tube 11, the tubes 11 and 12 may be fully telescoped and the tool removed from the piston.

In addition, the tubes 11 and 12 may be supplemented by additional telescoping tube sections as necessary in order to extend the support to greater heights.

It is anticipated that a wide variety of embodiments of the present invention may be devised without departing from the spirit and scope thereof.

What is claimed is:

1. A resilient tool support comprising a pair of telescoping tubes, means for locking the tubes in a fixed relative position, a piston carried by one tube for removably receiving a power tool, a coil spring carried by the piston for cushioning the piston, a fluid pressure actuated ram carried by the other tube operative to advance the tubes toward a work piece so that the tool engages the work piece and is continuously and resiliently urged toward the work piece by the spring.

2. A resilient tool support comprising a pair of telescoping tubes, means for locking the tubes in a fixed relative position, a sleeve bearing carried by one tube, a resiliently mounted piston carried by the bearing for removably receiving a power tool, a fluid pressure actuated ram carried by the other tube operative to advance the tubes toward a work piece so that the tool engages the work piece and is continuously and resiliently urged toward the work piece.

3. A tool support operative to hold a tool resiliently against a work piece comprising a pair of telescoping tubes, the first tube being formed with a fixed pressure cylinder including a ram projecting from said tube and movable relative thereto, conduit means communicating with said cylinder for admitting fluid under pressure effective to drive said ram out of said first tube towards a fixed abutment, the second tube being constructed and arranged to receive a piston, said piston carrying a clamp means for receiving and holding a power tool, a resilient means disposed between the second tube and the piston operative to maintain the second tube and the piston in a resiliently spaced condition and a vise means mounted upon the tubes operative to engage and lock the tubes in a given axial position wherein the tool virtually engages the work piece and the ram engages the abutment so that upon driving the ram the tool is urged against the work piece and held there resiliently.

4. A tool support operative to hold a tool resiliently against a work piece comprising a pair of telescoping tubes, the first tube being formed with a fixed pressure cylinder including a ram projecting from said tube and movable relative thereto, conduit means communicating with said cylinder for admitting fluid under pressure into said cylinder effective to drive said ram out of said first tube towards a fixed abutment, a second tube carrying a sleeve bearing and arranged to receive a piston, said piston carrying a clamp means for receiving and holding a power tool, a resilient means disposed between the second tube and the piston operative to maintain the second tube and the piston in a resiliently spaced condition and a vise means mounted upon the tubes operative to engage and lock the tubes in a given axial position wherein the tool virtually engages the work piece and the ram engages the abutment so that upon driving the ram the tool is urged against the work piece and held there resiliently.

5. A tool support operative to hold a tool resiliently against a work piece comprising a pair of telescoping tubes, a first tube being formed with a fixed pressure cylinder including a ram projecting from said first tube and movable relative thereto, conduit means communicating with said cylinder for admitting fluid under pressure into said cylinder effective to drive said ram out of said first tube towards a fixed abutment, the second tube being constructed and arranged to receive a piston, said piston carrying a clamp means for receiving and holding a power tool, a coil spring disposed between the second tube and the piston operative to maintain the second tube and the piston in a resiliently spaced condition and a vise means mounted upon the tubes operative to engage and lock the tubes in a given axial position wherein the tool virtually engages the work piece and the ram engages the abutment so that upon driving the ram the tool is urged against the work piece and held there resiliently.

References Cited in the file of this patent
UNITED STATES PATENTS
2,754,804    Miller ------------------ July 17, 1956